(12) United States Patent
Maier et al.

(10) Patent No.: US 8,146,922 B2
(45) Date of Patent: Apr. 3, 2012

(54) SHAFT ISOLATION SEAL

(75) Inventors: William C. Maier, Almond, NY (US); David J. Peer, Olean, NY (US)

(73) Assignee: Dresser-Rand Company, Olean, NY (US)

( * ) Notice: Subject to any disclaimer, the term of this patent is extended or adjusted under 35 U.S.C. 154(b) by 952 days.

(21) Appl. No.: 12/215,160

(22) Filed: Jun. 25, 2008

(65) Prior Publication Data
US 2009/0322033 A1  Dec. 31, 2009

(51) Int. Cl.
*F16J 15/447* (2006.01)
*F16J 15/40* (2006.01)

(52) U.S. Cl. ........ 277/347; 277/408; 277/412; 277/429; 277/423

(58) Field of Classification Search ............. 277/355, 277/408, 429, 412, 423, 347
See application file for complete search history.

(56) References Cited

U.S. PATENT DOCUMENTS

| | | | |
|---|---|---|---|
| 885,032 A * | 4/1908 | Ferranti | 415/173.6 |
| 1,779,076 A * | 10/1930 | Ray | 277/347 |
| 1,810,370 A * | 6/1931 | Ray | 277/412 |
| 2,487,177 A * | 11/1949 | Pollock | 277/429 |
| 3,311,343 A * | 3/1967 | Miller et al. | 415/230 |
| 3,589,827 A | 6/1971 | Gerasimenko et al. | |
| 4,022,479 A | 5/1977 | Orlowski | |
| 4,193,603 A * | 3/1980 | Sood | 277/304 |
| 4,389,052 A * | 6/1983 | Shimizu et al. | 277/346 |
| 4,466,620 A | 8/1984 | Orlowski | |
| 4,756,536 A * | 7/1988 | Belcher | 277/355 |
| 5,066,024 A * | 11/1991 | Reisinger et al. | 277/355 |
| 5,158,304 A * | 10/1992 | Orlowski | 277/421 |
| 5,499,902 A | 3/1996 | Rockwood | |
| 5,577,885 A | 11/1996 | Urlichs | |
| 5,636,848 A * | 6/1997 | Hager et al. | 277/420 |
| 6,000,701 A * | 12/1999 | Burgess | 277/412 |
| 6,017,037 A | 1/2000 | Fedorovich | |
| 6,030,175 A | 2/2000 | Bagepalli et al. | |

(Continued)

FOREIGN PATENT DOCUMENTS
WO   WO2009/158255 A1   12/2009

OTHER PUBLICATIONS

PCT/US2009/047674 International Report on Patentability dated Jan. 13, 2011.

(Continued)

*Primary Examiner* — Alison Pickard
(74) *Attorney, Agent, or Firm* — Edmonds Nolte, PC

(57) ABSTRACT

A seal assembly is for a compressor including a casing having first and second chambers and a shaft extending through the casing between the two chambers. The seal assembly includes a main body disposed about the shaft and between the two chambers and having a central axis, an inner surface spaced radially outwardly from the shaft to form a seal chamber. Annular sealing members are connected with the main body and extend radially from the body inner surface toward the shaft, the sealing members preventing flow between the first and second chambers through the seal chamber. A separator is coupled with the shaft adjacent to the main body and has separation passages fluidly connecting one of the two chambers with the seal chamber, each passage extending radially with respect to the shaft axis so as to direct liquids and solids contacting the passage inner surface away from the seal chamber.

21 Claims, 6 Drawing Sheets

U.S. PATENT DOCUMENTS

| | | | |
|---|---|---|---|
| 6,302,646 | B1 | 10/2001 | Dinc et al. |
| 6,416,057 | B1 * | 7/2002 | Adams et al. ............... 277/355 |
| 6,517,311 | B2 | 2/2003 | Funke |
| 6,536,773 | B2 * | 3/2003 | Datta ........................... 277/355 |
| 6,629,816 | B2 * | 10/2003 | Langston et al. ............ 415/111 |
| 6,880,829 | B1 * | 4/2005 | Datta ........................... 277/350 |
| 6,951,339 | B2 * | 10/2005 | Turnquist et al. ............ 277/628 |
| 6,976,679 | B2 * | 12/2005 | Goss et al. .................... 277/347 |
| 6,991,235 | B2 * | 1/2006 | Ebert et al. ................... 277/355 |
| 7,052,015 | B2 * | 5/2006 | Addis ........................... 277/355 |
| 7,055,827 | B2 * | 6/2006 | Langston et al. ............ 277/424 |
| 7,186,081 | B2 * | 3/2007 | Giesler et al. ................ 415/229 |
| 7,413,194 | B2 * | 8/2008 | Wright et al. ................ 277/355 |
| 7,458,584 | B2 * | 12/2008 | Addis ........................... 277/355 |
| 2002/0074730 | A1 * | 6/2002 | Mayer et al. ................. 277/355 |
| 2004/0253120 | A1 | 12/2004 | Meuter |
| 2006/0045739 | A1 * | 3/2006 | Giesler et al. ................ 415/229 |
| 2006/0181029 | A1 * | 8/2006 | Addis ........................... 277/355 |
| 2006/0192343 | A1 * | 8/2006 | Hashiba et al. .............. 277/355 |
| 2007/0018409 | A1 * | 1/2007 | Justak .......................... 277/355 |
| 2008/0217859 | A1 * | 9/2008 | Addis ........................... 277/303 |
| 2009/0322033 | A1 * | 12/2009 | Maier et al. .................. 277/355 |

OTHER PUBLICATIONS

PCT/US2009/047674 Written Opinion dated Aug. 19, 2009.

* cited by examiner

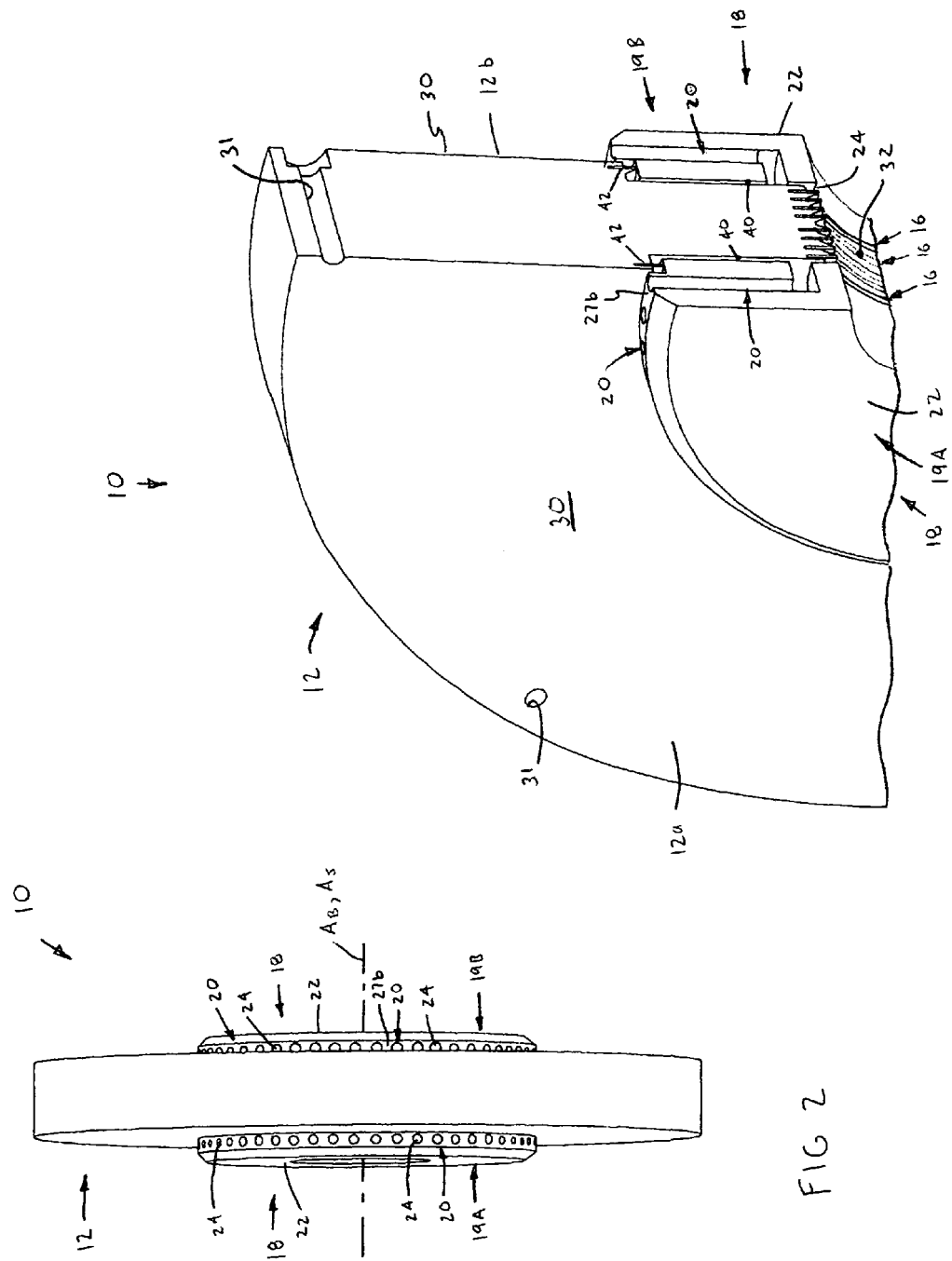

SHAFT ISOLATION SEAL

The present invention relates to fluid machinery, and more particularly to seal assemblies for compressors.

Centrifugal compressors are known and typically include a casing defining an interior chamber and having one or more fluid inlets and one or more fluid outlets. One or more impellers are mounted on a shaft extending through the chamber and are each configured to pressurize fluid entering the inlets and to discharge pressurized gas through the outlet(s). Generally, a driver, such as an electric motor, is operatively connected with the shaft and configured to drive the shaft so as to rotate the impellers.

In certain compressor assemblies, the driver is disposed within a chamber provided by either a separate casing mounted to the compressor casing or by a section of the compressor casing itself. In either case, a seal or seal assembly is needed to prevent or at least substantially limit fluid exchange between the compressor chamber and the driver chamber. In particular, liquid or solid particles may be entrained within a substantially gaseous fluid being processed by the compressor, and such contaminants could damage the driver if passed through to the driver chamber.

SUMMARY OF THE INVENTION

In one aspect, the present invention is a seal assembly for a compressor, the compressor including a casing having first and second chambers and a shaft extending through the casing between the two chambers. The seal assembly comprises a main body disposed circumferentially about the shaft and generally between the two chambers. The body has a central axis and an inner circumferential surface extending about the axis and spaced radially outwardly from the shaft so as to form a seal chamber. At least one annular sealing member is connected with the main body so as to extend generally radially from the body inner surface and generally toward the shaft. The at least one sealing member is configured to at least generally prevent fluid flow between the first and second chambers through the seal chamber. Further, a separator is coupled with the shaft, is disposed axially adjacent to the main body, and has at least one separation passage fluidly connecting one of the first and second chambers with the seal chamber. The separation passage has an inner surface and extends at least partially radially with respect to the shaft body axis. As such, the separator is configured to direct liquids and solids contacting the passage inner surface generally away from the seal chamber.

In another aspect, the present invention is again a seal assembly for a compressor, the compressor including a casing having first and second chambers and a shaft extending through the casing between the two chambers. The seal assembly comprises a main body disposed circumferentially about the shaft and generally between the two chambers, the body having a central axis and an inner circumferential surface extending about the axis and spaced radially outwardly from the shaft so as to form a seal chamber. At least one annular sealing member are connected with the main body so as to extend generally radially from the body inner surface and generally toward the shaft, the sealing member being configured to at least generally prevent fluid flow between the first and second chambers through the seal chamber. A separator includes a generally annular body coupled with the shaft and is disposed axially adjacent to the main body. The separator body has a central axis and a plurality of holes extending at least partially radially through the separator body and spaced circumferentially about the central axis. Each separator hole is configured to fluidly connect one of the first and second chambers with the seal chamber, has an inner surface, and is configured to direct liquids and solids contacting the inner surface generally away from the seal chamber.

In a further aspect, the present invention is once again a seal assembly for a compressor, the compressor including a casing having first and second chambers and a shaft extending through the casing between the two chambers. The seal assembly comprises a main body disposed circumferentially about the shaft and generally between the two chambers, the body having first and second axial ends, a central axis extending between the two ends, and an inner circumferential surface extending about the axis and spaced radially outwardly from the shaft so as to form a seal chamber. A plurality of annular sealing members are each connected with the main body so as to extend generally radially from the body inner surface and generally toward the shaft and being spaced axially from each other sealing member. At least one of the plurality of sealing members is configured to prevent fluid flow through the seal chamber in a first direction along the main body axis and at least another one of the plurality of sealing members is configured to prevent fluid flow through the seal chamber in a second, opposing direction along the main body axis. Further, a first separator is coupled with the shaft, is disposed axially adjacent to the main body first end, and includes at least one separation passage fluidly connecting the first chamber with the seal chamber and having an inner surface. The first separator passage extends at least partially radially with respect to the shaft body axis such that the first separator is configured to direct liquids and solids contacting the passage inner surface generally away from the seal chamber and into the first chamber. Furthermore, a second separator is coupled with the shaft, is disposed axially adjacent to the main body second end, and includes at least one separation passage fluidly connecting the second chamber with the seal chamber and having an inner surface. The second separator passage extends at least partially radially with respect to the shaft body axis such that the second separator is configured to direct liquids and solids contacting the passage inner surface generally away from the seal chamber and into the second chamber.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 2 is a front perspective view of the seal assembly;

FIG. 3 is an enlarged, broken-away side perspective view of the seal assembly;

DETAILED DESCRIPTION OF THE INVENTION

Figure 1:
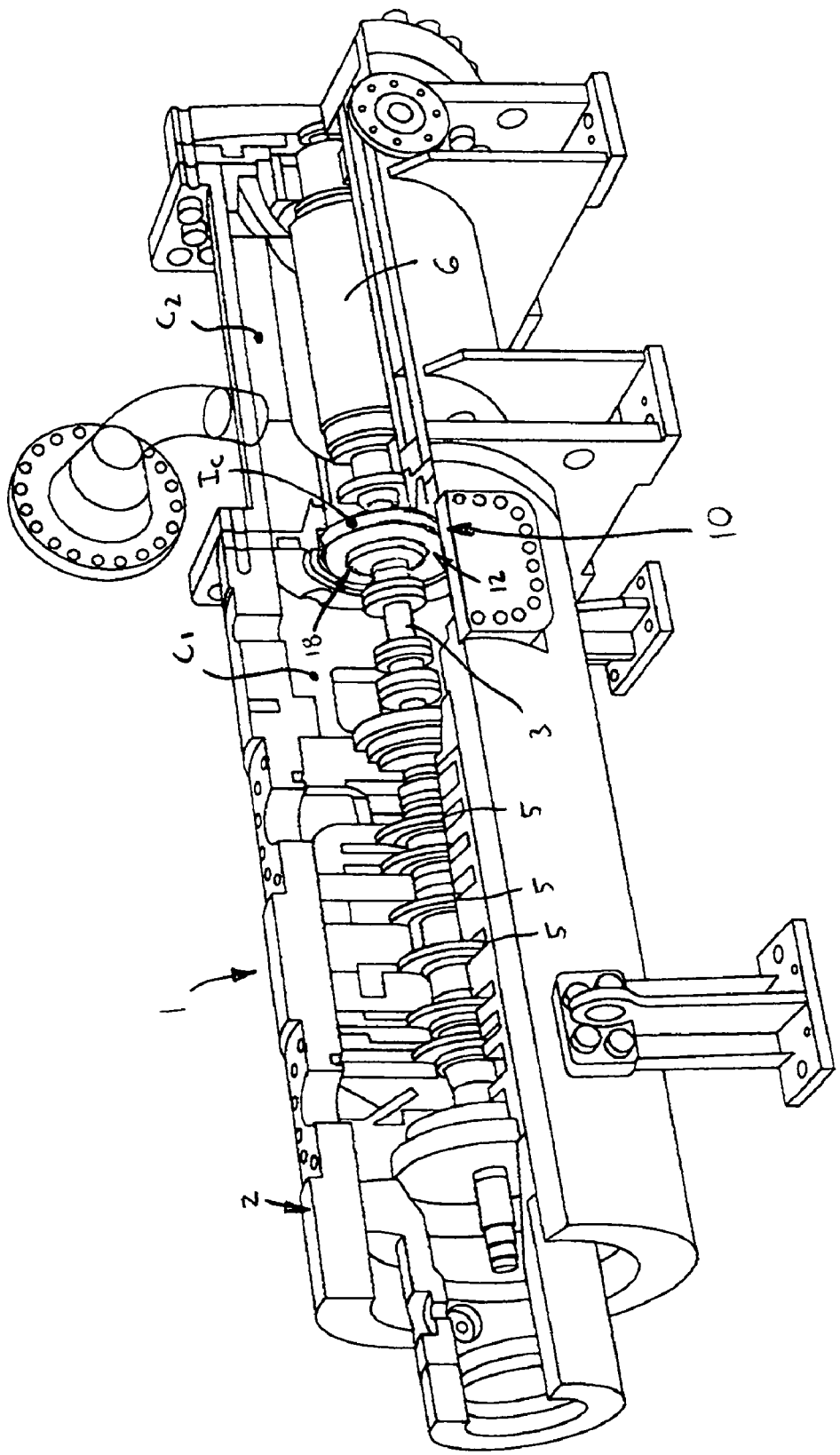
FIG. 1 is a broken-away, perspective view of a casing having a seal assembly in accordance with the present invention.
Figure 4:
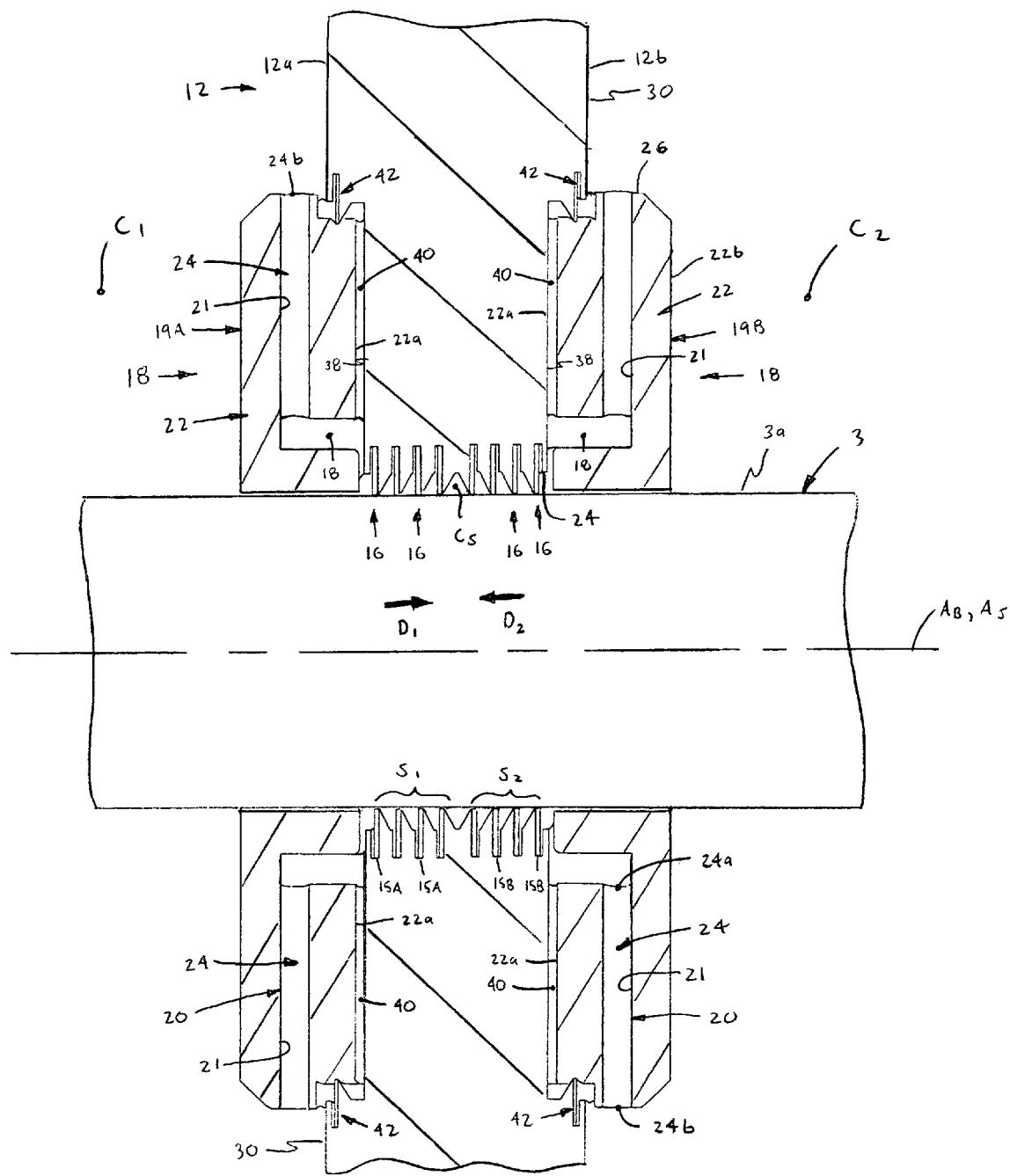
FIG. 4 is a broken-away, axial cross-sectional view of the seal assembly, shown mounted on a shaft.

Certain terminology is used in the following description for convenience only and is not limiting. The words "right", left", "lower", "upper", "upward", "down" and "downward" designate directions in the drawings to which reference is made. The words "inner", "inwardly" and "outer", "outwardly" refer to directions toward and away from, respectively, a designated centerline or a geometric center of an element being described, the particular meaning being readily apparent from the context of the description. Further, as used herein, the word "connected" is intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-8 a seal assembly 10 for a compressor 1, the compressor 1 including a casing 2 having first and second chambers $C_1$, $C_2$ and a shaft 3 extending through the casing 2 between the two chambers $C_1$, $C_2$. At least one impeller 5 is mounted on the shaft 3 and disposed in the first or compression chamber $C_1$ and a driver 6, such as an electric motor, is disposed in the second or driver chamber $C_2$ and is coupled with the shaft 3. The seal assembly 10 basically comprises a main body 12 disposed circumferentially about a section of the shaft 3 and generally between the two chambers $C_1$, $C_2$, at least one annular sealing member 16 connected with and extending inwardly from the body 12, and at least one separator 18 disposed adjacent to an end 12a or 12b of the main body 12. The main body 12 is preferably connected with the casing 2 so as to be generally stationary and has opposing axial ends 12a, 12b, a central axis $A_B$ extending between the two ends 12a, 12b, and an inner circumferential surface 14. The main body 12 is sized to substantially obstruct an interface $I_C$ (FIG. 1) between the two chambers $C_1$, $C_2$ and the body inner surface 14 extends about the axis $A_B$ and is spaced radially outwardly from the shaft 3 so as to form a seal chamber $C_S$. Preferably, a plurality of the annular sealing members 16 are each connected with the main body 12 so as to extend generally radially inwardly from the body inner surface 14 and generally toward the shaft 3. Each sealing member 16 is configured to at least generally prevent fluid flow between the first and second chambers $C_1$, $C_2$ through the seal chamber $C_S$, the plurality of members 16 collectively functioning to substantially prevent such fluid flow, as discussed in greater detail below.

Referring to FIGS. 2-6, the at least one separator 18 is coupled with the shaft 3 and is disposed axially adjacent to the main body 12, such that the separator(s) 18 rotate relative to the main body 12, for reasons described below. Preferably, the seal assembly 10 includes a first separator 19A disposed adjacent to the body first end 12a and a second separator 19B disposed adjacent to the body second end 12b, such that pressure axially across the seal assembly 10 is generally uniform, but the assembly 10 may include only a single separator 18 (structure not shown). Further, each separator 18 preferably has at least one and preferably a plurality of separation passages 20 each fluidly connecting one of the first and second chambers $C_1$, $C_2$ with the seal chamber $C_S$ and having an inner surface 21. Each of the one or more passages 20 extend at least partially radially, and preferably also partially axially, with respect to the shaft body axis $A_B$. As such, the one or more separators 18 are each configured to direct liquids and solids contacting the passage inner surface 21 generally away from the seal chamber $C_S$.

Thereby, any liquids or solids in a fluid stream flowing toward or even into the seal chamber $C_S$ are directed away from the chamber $C_S$ by centrifugal force. More specifically, liquids or solids in a fluid stream flowing within any passage 20 tends to contact the inner separation surface 21, as opposed to merely flowing centrally through the passage 20, due to rotation of the separator 18, which is in a direction perpendicular to the centerline of the passage 20. As such, the liquids and/or solids first separate from the flow upon contact with the surface 21, and are then directed to flow radially outwardly by centrifugal force until moving through the passage outer end 24b, as described below, and back into the casing chamber $C_1$ or $C_2$.

Preferably, each separator 18 includes a generally annular body 22 with a central bore 23, an axis $A_S$ extending through the bore 23, and a plurality of generally radially-extending or radial holes 24. Each annular body 22 has an inner axial end 22a, an opposing outer axial end 22b, and an outer circumferential perimeter or end 26 extending generally axially between the two axial ends 22a, 22b. The body inner axial end 22a has a generally radial end surface 25 and is disposed at least adjacent to, and preferably at least partially within, the seal main body 12, as described below. Preferably, the outer circumferential end 26 is formed with an inward radial "step" 26a so as to have first, radial-outermost outer circumferential surface 27a, a second, radial-innermost outer circumferential surface 27b and a generally radial surface 27c extending between the two outer circumferential surfaces 27a, 27b and facing generally toward the body inner end 22a. Thus, each separator body 12 is preferably formed so as to include a radially larger and a radially smaller, integrally-formed circular disks 29A, 29B.

Further, the radial holes 24 extend through the separator body 22 and are spaced circumferentially about the central axis $A_S$, each radial hole 24 providing a separate one of a plurality of the separation passages 20. Each of the radial holes 24 extends generally radially through the separator body 22 and has an inner end 24a fluidly coupled with the seal chamber $C_S$ and outer end 24b located at the body outer circumferential surface 27a. Preferably, each separator body 22 also includes a generally annular groove 28 extending generally axially from the body inner end 22a and circumferentially about the body axis $A_S$. The separator groove 28 is fluidly coupled with the seal chamber $C_S$ when the separator body 22 disposed adjacent to the seal assembly main body 12. Furthermore, the inner end 24a of each radial hole 24 preferably extends into the annular groove 28, such that the annular groove 28 fluidly couples all of the radial holes 24, and thus the separation passages 20, with the seal chamber $C_S$. Alternatively, each separator body 22 may be formed without the annular groove and with holes 24 that each have a first end 24a located at the body inner end 22a, such that each hole 24 is individually fluidly coupled with the seal chamber $C_S$.

Figure 7:
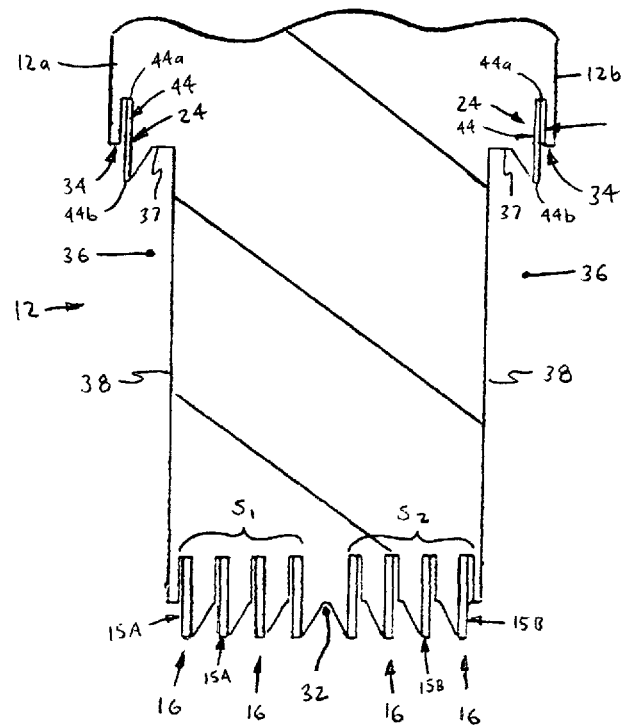
FIG. 7 is a broken-away, enlarged axial cross-sectional view of a main body and sealing members of the seal assembly.
Figure 8:
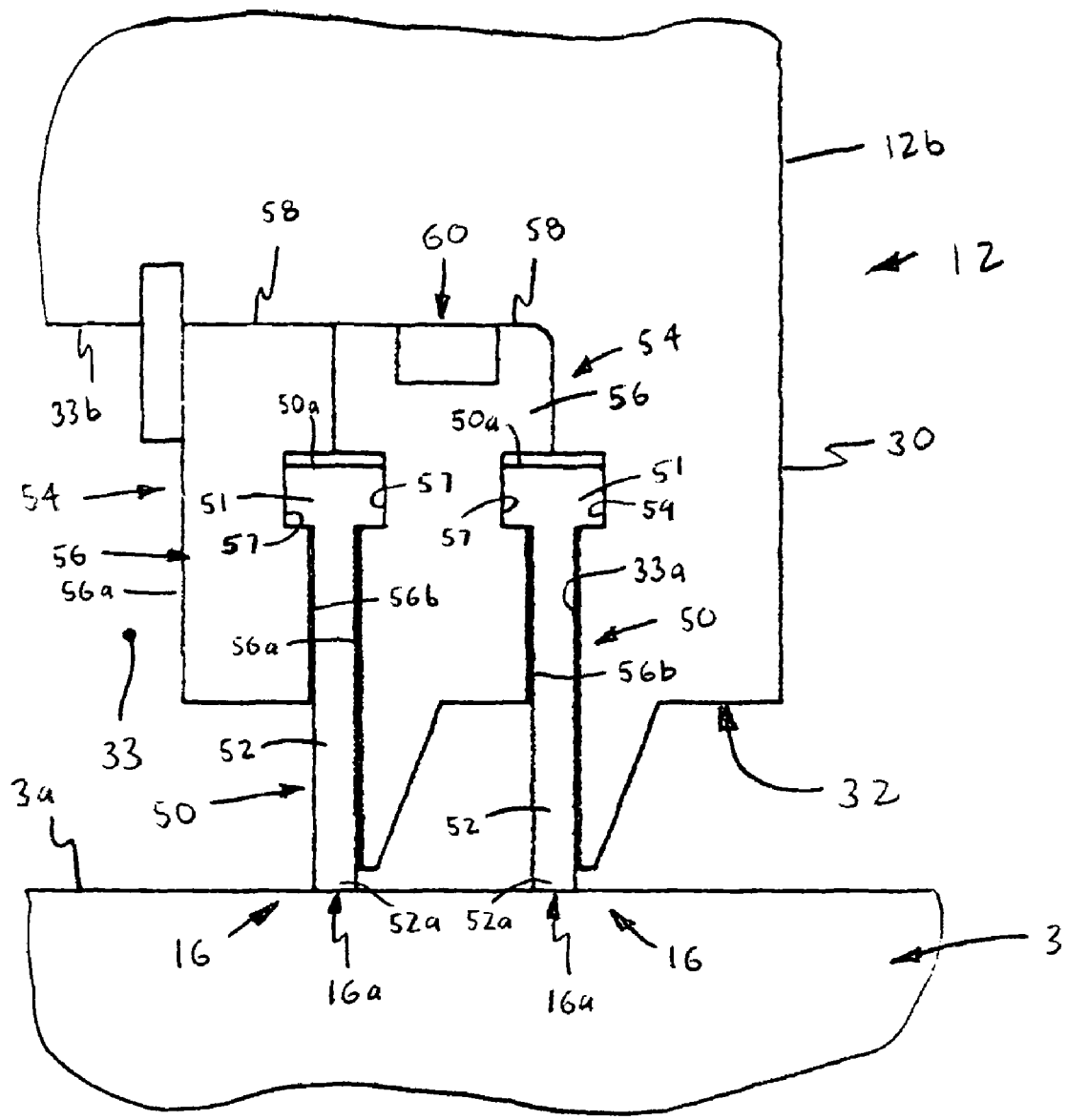
FIG. 8 is a more enlarged, broken-away cross-sectional view of two sealing members of the seal assembly.

Referring to FIGS. 2-5 and 7, the seal main body 12 is preferably generally annular and sized substantially radially larger than the annular bodies 22 of the two preferred separators 19A, 19B. The main body 12 has opposing axial ends 12a, 12b with radial end surfaces 30 and a central bore 32 extending between the two ends 12a, 12b, the main body axis $A_B$ extending centrally through the bore 32. A plurality of mounting holes 31 preferably extend into the main body 12 and are spaced circumferentially about the axis $A_B$, each mounting hole 31 being formed to receive a pin, bolt, or other component for connecting the main body 12 with the casing 2 (or a structural member(s) disposed within the casing 2). Further, the bore 32 is configured to retain at least one and preferably a plurality of sealing members 16. As best shown in FIG. 8, the bore 32 most preferably includes an offset annular pocket 33 defined between a pair of facing radial surfaces 33a and an inner circumferential surface 33b and configured to receive a plurality of sealing members 16, as described below. Furthermore, the main body 12 also preferably includes a pair of counterbore sections 34 extending axially into the body 12 from each side 12a, 12b and coupled with central bore 32, each counterbore section 34 providing a separate annular side cavity 36, as indicated in FIG. 7. Each side cavity 36 is at least partially bounded or defined by an inner circumferential surface 37 and a radial surface 38, and is sized to receive a portion of one of the separator bodies 22.

Figure 5:
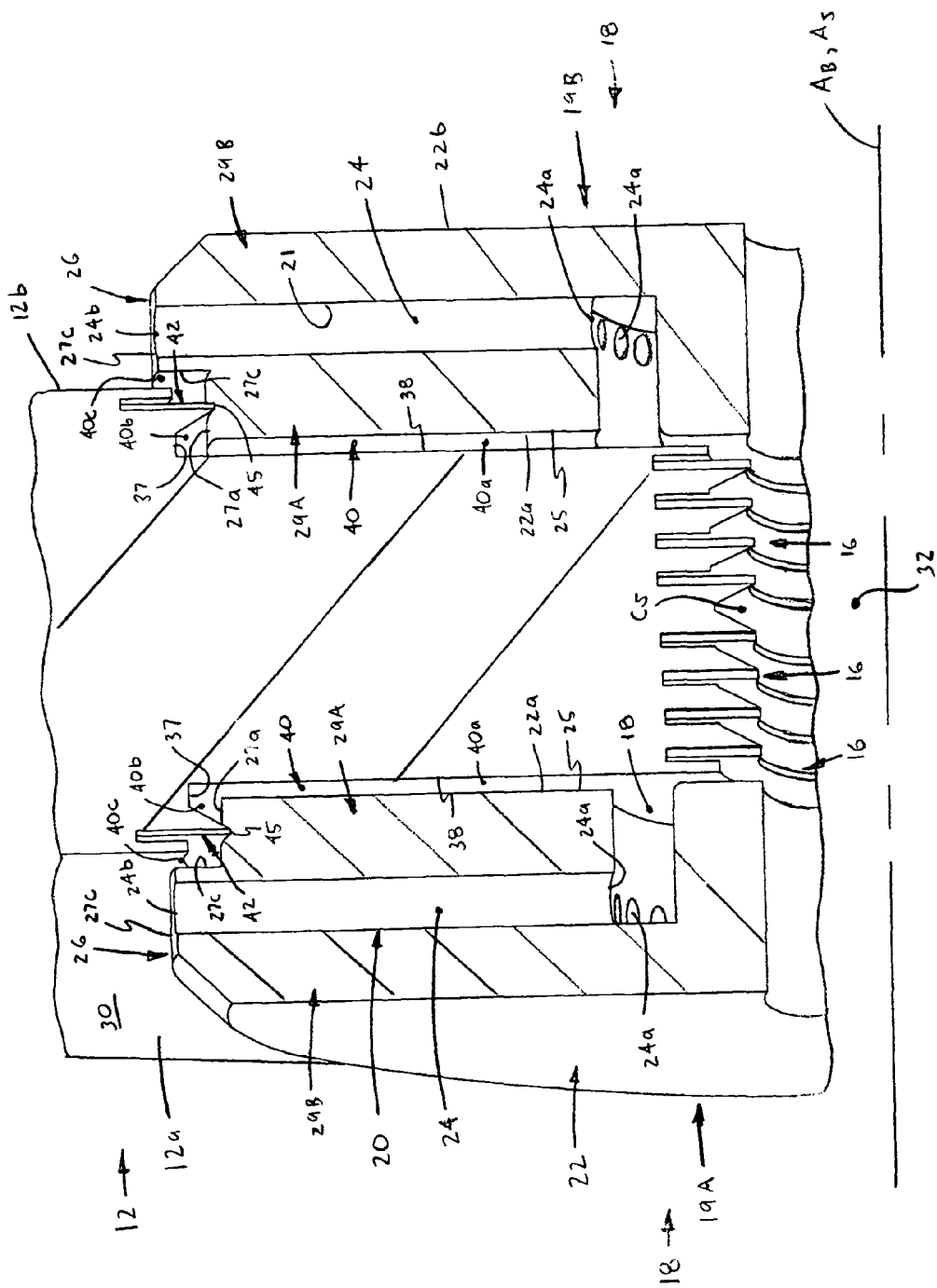
FIG. 5 is an enlarged, broken-away perspective view of an axial cross-section of the seal assembly.
Figure 6:
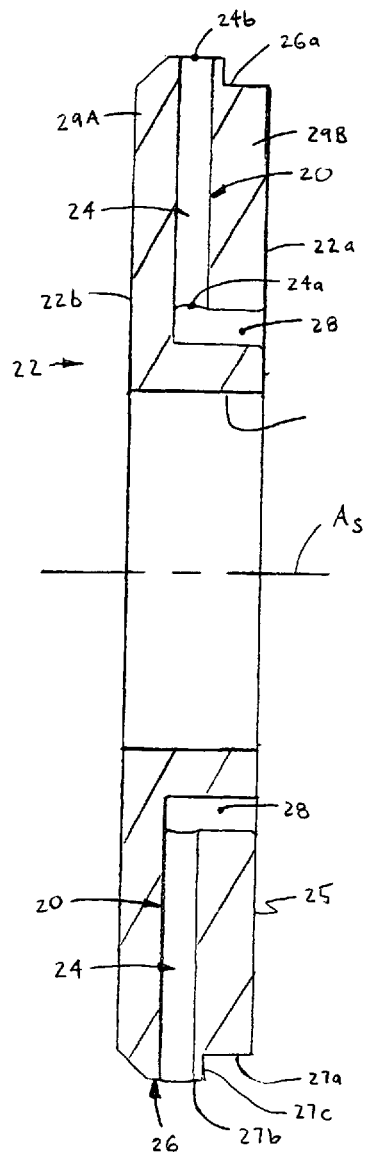
FIG. 6 is an axial cross-sectional view of a separator of the seal assembly.

That is, the radially-smaller disk 29B including the inner end 22a of each of the two preferred separator bodies 22 is preferably disposed within a separate one the main body side cavities 36 such that an outlet passage 40 is defined between each separator 18 and the seal main body 12, each outlet passage 40 being configured to fluidly couple the seal chamber $C_S$ with one of the first and second chambers $C_1$, $C_2$. More specifically, each separator body 22 is arranged such that the inner end 22a of each separator body 22 is spaced axially from the cavity radial surface 38, the separator outer surface 27b is spaced radially inwardly from the main body inner surface 37, and the separator radial surface section 27c is spaced axially from the main body axial end 12a or 12b. As such, each outlet passage 40 preferably has an inner radially-extending or radial section 40a defined between the facing radial surfaces 25, 30, a central axially-extending or annular section 40b defined between the facing circumferential surfaces 27b, 37, and an outer radially-extending/radial section 40c defined between facing radial surfaces 27c, 30, as indicated in FIG. 5.

Further, an exit sealing member 42 is preferably disposed within each outlet passage 40, preferably within the central axially-extending, annular section 40b, and is configured to prevent flow from the one casing chamber $C_1$ or $C_2$ fluidly coupled with the particular passage 40 and into the seal chamber $C_S$. Thus, fluid is only permitted to flow through the passage 40 in a direction outwardly from the seal chamber $C_S$ and is substantially prevented from flowing into the seal chamber $C_S$ from the passage 40. Preferably, the exit seal 42 includes a generally annular body 44 with a radial outer end 44a coupled with the main body 12 and an inner radial end 44b providing a sealing surface 45 disposed or disposeable against the separator outer circumferential surface 27b. Most preferably, the exit seal body 44 is formed as a brush seal 50, as described in detail below.

Referring now to FIGS. 4, 5, 7 and 8, each of the preferred sealing members 16 is connected with the seal assembly main body 12 and is spaced axially, i.e., along the body axis $A_B$, from each of the other sealing members 16. Each sealing member 14 has an inner sealing surface 16a disposeable or disposed generally against, or at least closely proximal to, the outer surface 3a of the shaft 3 or of a sleeve (not shown) mounted on the shaft 3. Preferably, the sealing members 16 are arranged and/or constructed such that at least one of the plurality of sealing members 16 is configured to generally or substantially prevent fluid flow through the seal chamber $C_S$ in a first direction $D_1$ along the main body axis $A_B$ and at least another one of the plurality of sealing members 16 is configured to prevent fluid flow through the seal chamber $C_S$ in a second, opposing direction $D_2$ along the main body axis $A_B$.

Most preferably, the plurality of sealing members 16 includes a first set $S_1$ of the sealing members 16 disposed generally proximal to the main body first end 12a and a second set $S_2$ of the sealing members 16 is disposed generally between the first set $S_1$ of sealing members 16 and the body second end 12b. Each sealing member 15A of the first sealing member set $S_1$ is configured to at least generally prevent fluid flow in the first direction $D_1$, thus toward the body second side 12b, and each sealing member 15B of the second sealing member set $S_2$ is configured to at least generally prevent fluid flow in the second direction $D_2$, i.e., toward the body first side 12a. Thus, the two sets $S_1$, $S_2$ of sealing members 16 function to prevent fluid flow through the seal chamber $C_S$ in either direction $D_1$ or $D_2$.

Referring particularly to FIG. 8, each sealing member 16 is or includes a brush seal 50 having inner and outer circumferential ends 50a, 50b and being disposed at least partially within the main body annular pocket 33. The brush seal outer end 50b is connected with the main body 12 and the seal inner end 50a is disposed generally against the shaft 3. Each brush sealing member 50 preferably includes an enlarged base or head portion 51 and an elongated sealing portion 52 extending radially inwardly from the head portion 52 and providing the sealing surface 16a. Further, each brush sealing member 50 is preferably formed of a plurality of generally arcuate segments spaced circumferentially about the body axis $A_B$, but may alternatively formed as a single annular body.

Further, the seal assembly 10 preferably further comprises a plurality of retainer members or retainers 54 each connected with the main body 12 and configured to retain at least one of the sealing members 16 coupled with the main body 12. That is, each retainer 54 is disposed within the main body pocket 33 and connects the inner end 50a of at least one of the preferred brush seals 50 with the main body 12. Preferably, each retainer member 54 includes a generally annular body 56 having an outer circumferential surface 58 disposed generally against the main body inner surface 33a and opposing axial ends 56a, 56b. Further, at least one of the body axial ends 56a and/or 56b includes a generally annular groove 57 extending axially inwardly from the body side 56a or 56b and an offset side surface 38. Each retainer groove 57 is alignable with either a groove 57 in an adjacent retainer member 54 or an annular side groove 59 formed in the main body 12, such that the aligned groove pairs 57/57 or 57/59 each receive a head portion 51 of a separate one of the preferred brush sealing members 50.

With the above retainer structure, each sealing member is sandwiched between either two adjacent retainer members 54 or between one retainer member 54 and a radial side surface 33a of the main body 12. Specifically, each retainer head portion 51 is disposed in the aligned groove pairs 57/57 or 57/59 and each retainer sealing portion 52 extends between either two retainer ends 56a/56b or one retainer end 54a or 54b and one main body radial surface 33a. Further, the inner end 52a of each sealing portion 52 is spaced axially inwardly from the retainers 54 and the main body bore 32 and is sealingly engageable with the shaft 3 or the sleeve (not depicted) on the shaft 3.

Still referring to FIG. 8, the seal assembly 10 preferably also comprises a plurality of secondary sealing members 60 (only one shown) each disposed generally between a separate one of the retainers 54 and the main body 12. Each secondary sealing member 60 is configured to at least generally prevent fluid flow through any space between the retainer outer surface 58 and the main body inner surface 33a. As such, the secondary sealing members 60 function to prevent leakage around the sealing members 16.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined in the appended claims.

We claim:

1. A seal assembly for a compressor, the compressor including a casing having first and second chambers and a rotatable shaft extending through the casing between the two chambers, the seal assembly comprising:
   a main body disposed circumferentially about the shaft and arranged between the two chambers, the body having a central axis and an inner circumferential surface extending about the axis and spaced radially-outward from the shaft so as to form a seal chamber;
   at least one annular sealing member connected with the main body so as to extend radially from the inner circumferential surface toward the shaft, the at least one sealing member being configured to prevent fluid flow between the first and second chambers through the seal chamber;
   a first separator arranged axially adjacent a first axial side of the main body and coupled to the shaft, the first separator defining at least one first separation passage having an inner surface and fluidly connecting the first chamber with the seal chamber, the at least one first separation passage extending at least partially radial with respect to the central axis such that the first separator is configured to direct liquids, solids, or both from the first chamber contacting the inner surface away from the seal chamber; and
   a second separator arranged axially adjacent a second axial side of the main body and coupled to the shaft, the second separator defining at least one separation passage having an inner surface and fluidly connecting the second chamber with the seal chamber, the at least one separation passage of the second separator extending at least partially radial with respect to the central axis such that the second separator is configured to direct liquids, solids, or both from the second chamber contacting the inner surface away from the seal chamber.

2. The seal assembly as recited in claim 1 wherein the main body is stationary and the first and second separators are configured such that rotation of the shaft rotates the first and second separators relative to the main body.

3. The seal assembly as recited in claim 1 wherein at least one of the first and second separators includes an annular body with a separator central axis and a plurality of radially-extending holes extending through the annular body and spaced circumferentially about the separator central axis, each radially-extending hole providing a separate one of the at least one separation passage of the at least one of the first and second separators.

4. The seal assembly as recited in claim 3 wherein the annular body has an inner axial end adjacent the main body and at least one of the first and second separators further includes an annular groove extending axially from the inner axial end thereof, the annular groove being fluidly coupled with the seal chamber, and each one of the radially-extending holes having an inner end extending into the annular groove such that the annular groove fluidly couples the plurality of radially-extending holes with the seal chamber.

5. The seal assembly as recited in claim 4 wherein the annular body has an outer circumferential surface and each one of the radially-extending holes extends radially between the annular groove and the separator circumferential surface.

6. The seal assembly as recited in claim 1 wherein at least one of the first and second separators has an inner axial end adjacent the main body and an annular groove extending axially from the inner axial end, the annular groove being fluidly coupled with the seal chamber, the at least one separation passage of the at least one of the first and second separators having an inner end extending into the annular groove such that annular groove fluidly couples the at least one separation passage with the seal chamber.

7. The seal assembly as recited in claim 1 wherein the seal assembly comprises a plurality of annular sealing members, each annular sealing member being connected with the main body and spaced axially from each adjacent annular sealing member.

8. The seal assembly as recited in claim 7 wherein at least one of the plurality of annular sealing members is configured to prevent fluid flow through the seal chamber in a first direction along the central axis and at least another one of the plurality of annular sealing members is configured to prevent fluid flow through the seal chamber in a second, opposing direction along the central axis.

9. The seal assembly as recited in claim 8 wherein the main body has first and second axial ends and the plurality of annular sealing members includes a first set of sealing members disposed proximal the first axial end and a second set of sealing members disposed between the first set of sealing members and the second axial end, each annular sealing member of the first set of sealing members being configured to prevent fluid flow in a direction toward the second axial end and each annular sealing member of the second set of sealing members being configured to prevent fluid flow in a direction toward the first axial end.

10. The seal assembly as recited in claim 7 wherein each annular sealing member comprises a brush seal having inner and outer circumferential ends, the outer circumferential end being connected with the main body and the inner circumferential end being disposed the rotatable shaft.

11. The seal assembly as recited in claim 7 further comprising a plurality of retainer members each connected with the main body and configured to maintain the plurality of annular sealing members coupled with the main body.

12. The seal assembly as recited in claim 11 wherein each retainer member has an outer circumferential surface disposed against the inner circumferential surface of the main body and the seal assembly further comprises a plurality of secondary sealing members each disposed between a separate one of the retainer members and the main body and configured to prevent fluid flow between the outer circumferential surface of the retainer member and the inner circumferential surface of the main body.

13. The seal assembly as recited in claim 11 wherein each retainer has is axially spaced from adjacent retainer members and each annular sealing member is interposed between either two adjacent retainer members or one retainer member and a portion of the main body.

14. The seal assembly as recited in claim 11 wherein each retainer member includes opposing axial ends defining at least one annular groove, each annular groove being configured to receive a head portion of the plurality of annular sealing member.

15. The seal assembly as recited in claim 1 further comprising at least one annular retainer member coupleable with the main body and configured to connect the at least one annular sealing member with the main body.

16. The seal assembly as recited in claim 1 wherein the main body and at least one of the first and second separators define an outlet passage configured to fluidly couple the seal chamber with one of the first and second chambers, the main body further providing an exit sealing member configured to prevent flow from one of the first and second chambers and into the outlet passage.

17. The seal assembly as recited in claim 16 wherein the main body has opposing axial ends with a counterbore section extending axially outward from at least one of the axial ends and defining an annular cavity, at least one of the first and second separators being at least partially disposed within the annular cavity such that the outlet passage is defined between the separator and the main body.

18. The seal assembly as recited in claim 17 wherein:
the main body further has a central bore that defines the seal chamber and a radial surface extending between the central bore and the counterbore section, the counterbore section having an inner circumferential surface; and
at least one of the first and second separators has a circular disk portion disposed within the annular cavity of the main body, the disk portion having outer circumferential surface and a radial end surface, the outer circumferential surface of the circular disk portion being spaced radially inward from the inner circumferential surface of the counterbore section so as to define an annular outer portion of the outlet passage and the radial end surface of the circular disk portion being spaced axially from the radial end surface of the main body so as to define a radial inner portion of the outlet passage.

19. The seal assembly as recited in claim 18 wherein the exit sealing member includes an annular body disposed within the annular outer portion of the outlet passage.

20. A seal assembly for a compressor, the compressor including a casing having first and second chambers and a shaft extending through the casing between the two chambers, the seal assembly comprising:
a main body disposed circumferentially about the shaft and between the first and second chambers, the main body having first and second axial sides, a central axis and an inner circumferential surface extending about the central axis and spaced radially outward from the shaft so as to form a seal chamber;
at least one sealing member connected with the main body so as to extend radially from the inner circumferential surface and toward the shaft, the at least one sealing member being configured to prevent fluid flow between the first and second chambers through the seal chamber;
a first separator including an annular body coupled with the shaft and disposed axially adjacent the first axial side of the main body, the annular body having a central axis and a plurality of holes extending at least partially radial through the annular body and spaced circumferentially about the central axis, each hole being configured to fluidly connect one of the first and second chambers with the seal chamber and further having an inner surface configured to direct liquids, solids, or both from the first chamber contacting the inner surface away from the seal chamber; and
a second separator coupled with the shaft and disposed axially adjacent the second axial side of the main body, the second separator configured to direct liquids, solids, or both from the second chamber away from the seal chamber.

21. A seal assembly for a compressor, the compressor including a casing having first and second chambers and a shaft extending through the casing between the two chambers, the seal assembly comprising:
a main body disposed circumferentially about the shaft and between the first and second chambers, the main body having first and second axial ends, a central axis extending between the first and second axial ends, and an inner circumferential surface extending about the central axis and spaced radially outward from the shaft so as to form a seal chamber;
a plurality of annular sealing members each connected with the main body so as to extend radially from the inner circumferential surface and toward the shaft and being spaced axially from adjacent annular sealing members, wherein at least one of the plurality of annular sealing members is configured to prevent fluid flow through the seal chamber in a first direction along the central axis and wherein at least another one of the annular plurality of sealing members is configured to prevent fluid flow through the seal chamber in a second, opposing direction along the central axis;
a first separator coupled with the shaft and disposed axially adjacent the first axial end, the first separator including at least one separation passage fluidly connecting the first chamber with the seal chamber and having an inner surface, the at least one separation passage of the first separator extending at least partially radial with respect to the central axis such that the first separator is configured to direct liquids and solids contacting the inner surface of the at least one separation passage of the first separator away from the seal chamber and into the first chamber; and
a second separator coupled with the shaft and disposed axially adjacent the second axial end, the second separator including at least another separation passage fluidly connecting the second chamber with the seal chamber and having an inner surface, the at least another second separator passage of the second separator extending at least partially radial with respect to the central axis such that the second separator is configured to direct liquids and solids contacting the inner surface of the at least another separation passage of the second separator away from the seal chamber and into the second chamber.

\* \* \* \* \*